(12) United States Patent
Itakura et al.

(10) Patent No.: US 9,929,424 B2
(45) Date of Patent: Mar. 27, 2018

(54) PROTON CONDUCTOR, METHOD FOR PRODUCING PROTON CONDUCTOR, AND FUEL CELL

(71) Applicants: DENSO CORPORATION, Kariya, Aichi-pref. (JP); Kyoto University, Kyoto, Kyoto-pref. (JP)

(72) Inventors: Tomoya Itakura, Kariya (JP); Yoshimasa Hijikata, Kariya (JP); Satoshi Horike, Kyoto (JP); Susumu Kitagawa, Kyoto (JP)

(73) Assignees: DENSO CORPORATION, Kariya (JP); Kyoto University, Kyoto (JP)

( * ) Notice: Subject to any disclaimer, the term of this patent is extended or adjusted under 35 U.S.C. 154(b) by 70 days.

(21) Appl. No.: 15/220,828

(22) Filed: Jul. 27, 2016

(65) Prior Publication Data

US 2017/0033386 A1    Feb. 2, 2017

(30) Foreign Application Priority Data

Jul. 30, 2015  (JP) .................................. 2015-150728

(51) Int. Cl.
*H01M 8/1046* (2016.01)
*H01M 8/1069* (2016.01)
*H01M 8/1018* (2016.01)

(52) U.S. Cl.
CPC ....... *H01M 8/1046* (2013.01); *H01M 8/1069* (2013.01); *H01M 2008/1095* (2013.01)

(58) Field of Classification Search
CPC combination set(s) only.
See application file for complete search history.

(56) References Cited

U.S. PATENT DOCUMENTS

| 9,178,239 B2 * | 11/2015 | Itakura ................ H01M 8/1067 |
| 2014/0011103 A1 | 1/2014 | Itakura et al. |

FOREIGN PATENT DOCUMENTS

| EP | 0 702 376 A1 | 3/1996 |
| JP | 2005158646 A * | 6/2005 |
| JP | 2009-252582 A | 10/2009 |
| JP | 2009295539 A * | 12/2009 |
| JP | 2013-168352 A | 8/2013 |

* cited by examiner

*Primary Examiner* — Carlos Barcena
(74) *Attorney, Agent, or Firm* — Posz Law Group, PLC

(57) ABSTRACT

A proton conductor includes a coordination polymer having stoichiometrically metal ions, oxoanions, and proton coordinating molecules capable of undergoing protonation or deprotonation. The coordination polymer including coordination entities that are repeatedly coordinated to bond the coordination entities with one another. Each coordination entity is either a first coordination entity or a second coordination entity. The first coordination entity is one metal ion of the metal ions coordinated with either at least one oxoanion of the oxoanions or at least one proton coordinating molecule of the proton coordinating molecules. The second coordination entity is the metal ion coordinated with each of at least one oxoanion of the oxoanions and at least one proton coordinating molecule of the proton coordinating molecules. At least a part of the proton conductor is non-crystalline. The proton conductor has high ion conductivity at high temperature.

11 Claims, 3 Drawing Sheets

PAA

PVPA

PSSA

B: NUCLEIC ACID BASE
DNA

PROTON CONDUCTOR, METHOD FOR PRODUCING PROTON CONDUCTOR, AND FUEL CELL

CROSS REFERENCE TO RELATED APPLICATION

This application is based on Japanese Patent Application No. 2015-150728 filed on Jul. 30, 2015, the disclosure of which is incorporated herein by reference.

TECHNICAL FIELD

The present disclosure relates to a proton conductor, a method for producing the proton conductor, and a fuel cell.

BACKGROUND

Conventionally, an operation temperature of an electrolyte material of a solid polymer fuel cell is lower than 100° C. In the conventional electrolyte material, since an ion is conducted through moisture in a film, a system for controlling the moisture in the electrolyte material is required.

From the viewpoints of reduction of the cost of the system for the solid polymer fuel cell and simplification of the system, an electrolyte material that has an operation temperature equal to or higher than 100° C. and operates under a non-humidification or a low-humidification condition. JP 2014-116276 A (corresponding to US 2014/0011103 A1) discloses such electrolyte material.

SUMMARY

An electrolyte material is desired to have further high ion conductivity.

It is an object of the present disclosure to provide a proton conductor having high ion conductivity, a method for producing the proton conductor, and the fuel cell.

According to an aspect of the present disclosure, a proton conductor includes a coordination polymer having stoichiometrically metal ions, oxoanions, and proton coordinating molecules capable of undergoing protonation or deprotonation. The coordination polymer including coordination entities that are repeatedly coordinated to bond the coordination entities with one another. Each coordination entity is either a first coordination entity or a second coordination entity. The first coordination entity is one metal ion of the metal ions coordinated with either at least one oxoanion of the oxoanions or at least one proton coordinating molecule of the proton coordinating molecules. The second coordination entity is the metal ion coordinated with each of at least one oxoanion of the oxoanions and at least one proton coordinating molecule of the proton coordinating molecules. At least a part of the proton conductor is non-crystalline. The proton conductor according to the aspect of the present disclosure has high ion conductivity at high temperature (e.g., 100° C. or more).

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Figure 1A:
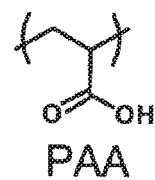
FIGS. 1A to 1D are diagrams illustrating organic polymers for examples of an additive material.

An embodiment of the present disclosure will be described.

1. Proton Conductor

A proton conductor of the present embodiment includes a metal ion, an oxoanion, and a proton coordinating molecule. Both of the oxoanion and the proton coordinating molecule coordinate to the metal ion to form coordination polymer, or, either one of the oxoanion and the proton coordinating molecule coordinates to the metal ion to form the coordination polymer.

For example, the oxoanion may coordinate to the metal ion in a monomer state without condensation. In this case, high proton concentration is retained in the proton conductor, and the proton conductor shows excellent water stability.

For example, a phosphate ion, a sulfate ion and the like may be considered as the oxoanion. The phosphate ion is preferable because the phosphate ion has chemical stability to hydrogen. The phosphate ion may be a hydrogen phosphate ion having one proton coordinating to the phosphate ion, or a dihydrogen phosphate ion having two protons coordinating to the phosphate ion.

The proton coordinating molecule of the present embodiment is a molecule that has preferably two or more coordination sites to which the proton coordinates. The proton coordinating molecule is held within a structure of the proton conductor by a coordinate bond with the metal ion, or by an interaction of a hydrogen bond or a coulomb bond with the oxoanion. The proton coordinating molecule does not volatile even at 100° C. or more.

From the viewpoint of ion conductivity, imidazole, triazole, benzimidazole, benztriazole and their derivatives are preferable as the proton coordinating molecule because these molecules have coordination sites with excellent balance of coordination and desorption of the proton.

In the present disclosure, the derivative means a molecule a part of chemical structure of which is replaced by other atom or other atomic group compared to the original molecule. For example, 2-methylimidazole, 2-ethylimidazole, histamine, histidine and the like are derivatives of imidazole, in which a part of chemical structure is replaced by other atom or other atomic group.

For example, as the proton coordinating molecule, primary amine that is expressed by a general formula of R—$NH_2$, secondary amine that is expressed by a general formula of $R^1(R^2)$—NH, and tertiary amine that is expressed by a general formula of $R^1(R^2)(R^3)$—N may be considered. R, $R^1$, $R^2$ and $R^3$ independently represent one of alkyl group, aryl group, alicyclic hydrocarbon group and heterocyclic group.

For example, as the primary amine, lower-alkylamine such as methylamine, ethylamine, propylamine, and the like, and aromatic amine such as aniline, toluidine and the like may be considered.

For example, as the secondary amine, di-lower-alkylamine such as diethylamine, dipropylamine and the like, and aromatic secondary amine such as N-methylaniline, N-methyltoluidine and the like may be considered.

For example, as the tertiary amine, tri-lower-alkylamine such as trimethylamine, trietheylamine and the like may be considered.

For example, as the proton coordinating molecule, carbon linear chain diamine such as ethylenediamine, and its N-lower-alkyl derivative (e.g., tetramethylethylenediamine) and the like may be considered.

Also, as the proton coordinating molecule, saturated cyclic amine such as pyrrolidine, N-lower-alkylpyrrolidine (e.g., N-methyl pyrrolidine), piperidine and N-lower-alkylpiperidine (e.g., N-methyl piperidine), morpholine, N-lower-alkylmorpholine (e.g., N-methylmorpholine) may be considered.

Furthermore, as the proton coordinating molecule, saturated cyclic diamine such as piperadine, N-lower-alkylpiperadine (e.g., N,N-dimethylpiperadine), 1,4-diazabicyclo[2.2.2]octane (another name: triethylenediamine) may be considered.

Although the metal ion of the present embodiment is not especially limited, from the viewpoint of formation of the coordination bond with the oxoanion and/or proton coordinating molecule, transition metal ions in high period or main-group metal ions are preferable for the metal ion of the present embodiment. Especially, cadmium ion, manganese ion, cobalt ion, cupper ion, zinc ion, and gallium ion are preferable for the metal ion of the present embodiment.

The proton conductor of the present embodiment includes the metal ion, the oxoanion and the proton coordinating molecule. In order to form the coordination polymer efficiently, it is preferable to combine 1 to 4 moles of oxoanion and 1 to 3 moles of proton coordination molecule per 1 mole of metal ion.

When less than 1 mole of the oxoanion and the proton coordinating molecule is combined, there is a possibility that the coordination polymer is not formed. When more than 4 moles of oxoanion or more than 3 moles of proton coordinating molecule are combined, there is a possibility that proton conductor is not formed in a solid state, the proton conductor shows high hygroscopicity, and morphological stability of the proton conductor is significantly decreased.

At least a part of the proton conductor of the present embodiment is non-crystalline. Entire part of the proton conductor of the present embodiment may be non-crystalline. The proton conductor of the present embodiment may be a mixture of a non-crystalline part and a crystalline part. It is confirmed that the part of the proton conductor is non-crystalline by an x-ray diffraction.

The proton conductor of the present embodiment may include an additive material in addition to the metal ion, oxoanion, and the proton coordinating molecule. For example, as the additive material, one or more selected from a group consisting of metal oxide, organic polymer and alkali metal ion may be considered. When the proton conductor includes the additive material, ion conductivity is improved at low temperature (e.g., lower than 100° C.), without lowering the performance of the proton conductor at high temperature (e.g., 100° C. or more).

An additive amount of the additive material is preferably within a range of 1 to 20 parts by weight (pts. wt.) when the total weight of the metal ion, oxoanion and the proton coordinating molecule is set to 100 pts. wt. When the additive material is the metal oxide or the organic polymer, the additive amount of the additive material is preferably within a range of 5 to 20 pts. wt. When the additive amount is within such a range, ion conductivity is improved at low temperature (e.g., lower than 100° C.), without lowering the performance of the proton conductor at high temperature (e.g., 100° C. or more).

For example, as the metal oxide, one or more selected from a group consisting of $SiO_2$, $TiO_2$, $Al_2O_3$, $WO_3$, $MoO_3$, $ZrO_2$ and $V_2O_5$ may be considered. When the metal oxide described above is employed, ion conductivity is improved at low temperature (e.g., lower than 100° C.), without lowering the performance of the proton conductor at high temperature (e.g., 100° C. or more).

A particle diameter of the metal oxide is preferably within a range from 5 to 500 nm. When the particle diameter of the metal oxide is within such a range, ion conductivity is improved at low temperature (e.g., lower than 100° C.), without lowering the performance of the proton conductor at high temperature (e.g., 100° C. or more). The particle diameter of the present embodiment means a value that is obtained by taking an image of the metal oxide particle by an electron microscope (e.g., scanning electron microscope: SEM) and by analyzing the image.

The organic polymer preferably has an acidic functional group. When the organic polymer having the acidic functional group, ion conductivity is further improved at low temperature (e.g., lower than 100° C.), without lowering the performance of the proton conductor at high temperature (e.g., 100° C. or more).

For example, as the acidic functional group, carboxyl group (—COOH), sulfo group (—$SO_3H$) and phosphono group (—$PO_3H_2$) may be considered. PH of the organic polymer is preferably within a range equal to or less than 4. When the pH of the organic polymer is within such a range, ion conductivity is further improved at low temperature (e.g., lower than 100° C.), without lowering the performance of the proton conductor at high temperature (e.g., 100° C. or more).

Figure 1B:
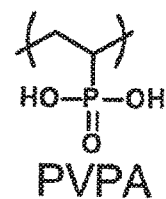
Figure 1C:
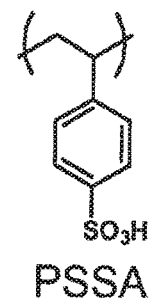
Figure 1D:
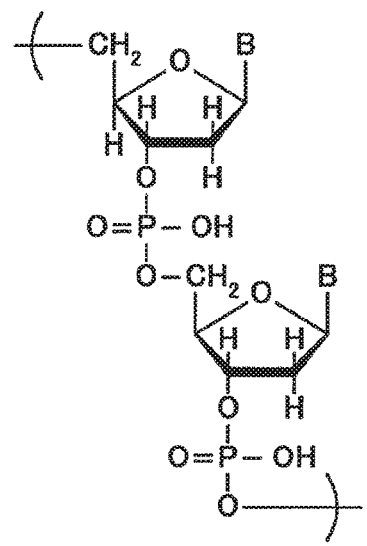

For example, as the organic polymer, polyacrylic acid (PAA) as shown in FIG. 1A, polyvinylphosphonic acid (PVPA) as shown in FIG. 1B, polystyrenesulfonic acid (PSSA) as shown in FIG. 1C and deoxyribonucleic acid (DNA) as shown in FIG. 1D may be considered.

For example, as the alkali metal ion, one or more metal ion selected from a group consisting of Li, Na, K, Rb, Cs may be considered. When such alkali metal ion is employed, ion conductivity is further improved at low temperature (e.g., lower than 100° C.), and at high temperature (e.g., 100° C. or more).

2. Method for Producing Proton Conductor

Figure 6:
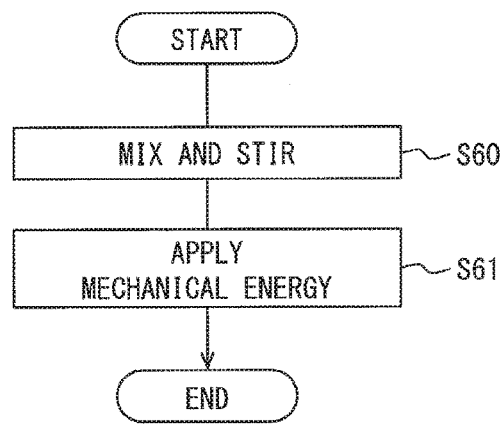
FIG. 6 is a flowchart diagram for illustrating a method for producing a proton conductor.

When the proton conductor does not include the additive material, the proton conductor of the present embodiment is produced by mixing and stirring metal compound as metal ion source (e.g., metal oxide), oxoacid (e.g., oxoanion) and the proton coordinating molecule, and by applying mechanical energy. For example, as shown in FIG. 6, the method for producing the proton conductor includes a step of mixing and stirring the metal compound, the oxoacid and the proton coordinating molecule (S60), and a step of applying the mechanical energy (S61).

In the step of mixing and stirring, solvent that dissolves or equally disperses each of row materials may be employed. However, from the viewpoint of production cost, it is preferable to perform the step of mixing and stirring in solvent-free condition. When the method for producing the proton conductor is performed at a temperature higher than 200° C., there is a possibility that condensation of the oxoanion (e.g., phosphate ion) occurs. Therefore, it is preferable to perform the method for producing the proton conductor at a temperature equal to or lower than 200° C.

The step of applying the mechanical energy is a step of applying pressure to the raw materials (i.e., metal compound, oxoacid (oxoanion) and proton coordinating molecule). For example, the step of applying the mechanical energy is performed by using a ball mill or a press machine.

When the proton conductor includes the additive material, the proton conductor of the present embodiment is produced by mixing and stirring metal compound as metal ion source (e.g., metal oxide), oxoacid (e.g., oxoanion), the proton coordinating molecule and the additive material, and by applying mechanical energy. In the step of mixing and stirring, it is preferable to mix and stir all of the raw materials at once.

In the step of mixing and stirring, solvent that dissolves or equally disperses each of row materials may be employed. However, from the viewpoint of production cost, it is preferable to perform the step of mixing and stirring in solvent-free condition. When the method for producing the proton conductor is performed at a temperature higher than 200° C., there is a possibility that condensation of the oxoanion (e.g., phosphate ion) occurs. Therefore, it is preferable to perform the method for producing the proton conductor at a temperature equal to or lower than 200° C.

The step of applying the mechanical energy is a step of applying pressure to the raw materials (i.e., metal compound, oxoacid (oxoanion), proton coordinating molecule and additive material). For example, the step of applying the mechanical energy is performed by using a ball mill or a press machine.

3. Fuel Cell

A fuel cell of the present embodiment employs the proton conductor described above as an electrolyte. In the proton conductor providing the electrolyte of the fuel cell of the present embodiment, water is not used as medium of ion conduction. Therefore, the fuel cell of the present embodiment operates under the non-humidification or the low-humidification condition. The system for controlling the moisture in the electrolyte is not essential for the fuel cell of the present embodiment.

Furthermore, in the proton conductor providing the electrolyte of the fuel cell of the present embodiment, liquid (including other than water) is not used as medium of ion conduction. Therefore, in the fuel cell of the present embodiment, it is restricted a possibility that the liquid leaks, that deterioration of the fuel cell is caused by the leaked liquid reacting at an electrode, and that an output of the fuel cell is lowered by mixed potential.

Example 1

266 mg of cadmium acetate dihydrate, 134 µL of 85% phosphoric acid aqueous solution, 138 mg of 1, 2, 4-triazole are measured and put into a mortar, and thereafter, mixed and stirred for 15 minutes at room temperature under atmosphere environment. The mixture is dried for 15 hours at 80° C. in a thermostatic chamber to obtain white powder.

The obtained white powder is analyzed by X-ray diffraction analysis. As a result, the obtained white powder has a crystal structure in which four molecules of 1,2,4-triazole coordinate to cadmium ion having six coordination sites and two molecules of phosphate ion ($H_2PO_4$) coordinate to the cadmium ion in the vertical direction.

Figure 2:
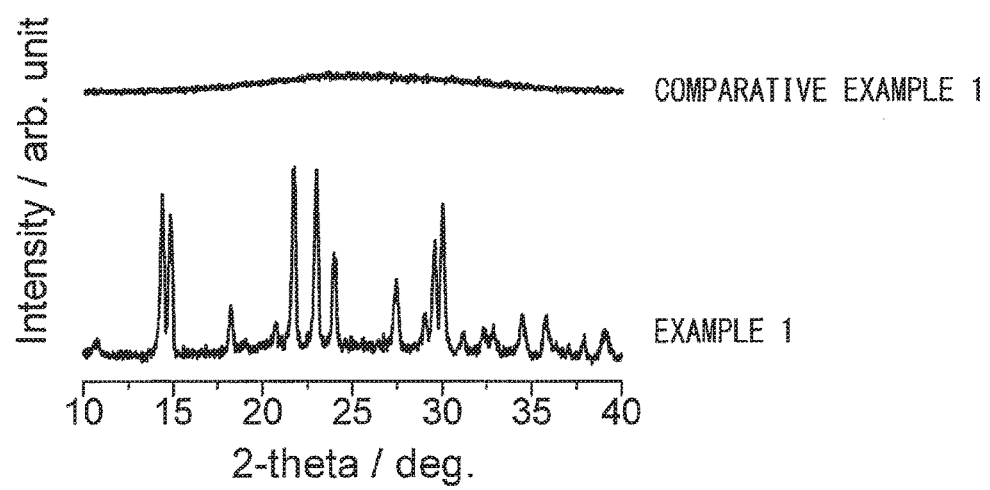
FIG. 2 is a diagram illustrating results of x-ray diffraction in example 1 and comparative example 1.

150 mg of the obtained crystalline white powder and 3560 mg of ball having 10 mm of diameter are enclosed in a container made of zirconia and having 20 mL of capacity, and air in the container is substituted by argon. Thereafter, ball milling is performed for 500 minutes at 400 rpm of rotation number to obtain non-crystalline powder. It is confirmed that the obtained powder is non-crystalline by the x-ray diffraction. The result of the x-ray diffraction is shown in FIG. 2. The obtained non-crystalline power is one example of a proton conductor at least a part of which is non-crystalline.

Figure 3:
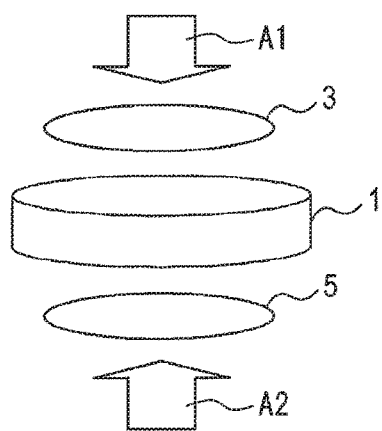
FIG. 3 is a diagram illustrating a method for producing a single cell of a fuel cell.
Figure 4:
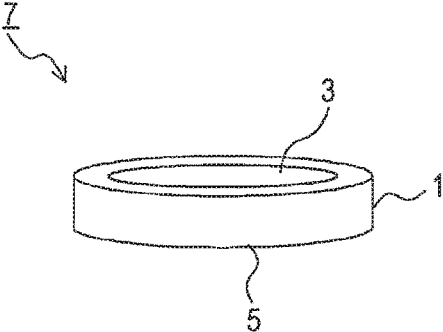
FIG. 4 is a diagram illustrating a perspective view of the single cell of the fuel cell.

As shown in FIG. 3, the obtained non-crystalline powder is molded into a pellet having 10 mm of diameter to obtain an electrolyte 1. As shown by arrows A1 and A2 of FIG. 3, electrodes 3 and 5 made of gold and having 10 mm of diameter are attached at both sides of the electrolyte 1 to obtain a single cell 7 shown in FIG. 4. Ion conductivity of the single cell 7 is calculated by an AC impedance measurement. The measurement is executed under nitrogen atmosphere. Frequency domain is set from 0.1 Hz to 1 MHz and voltage magnitude is set to 300 mV. As a result, the ion conductivity of the single cell 7 is $1.0 \times 10^{-4}$ S/cm at 130° C.

Example 2

245 mg of manganese acetate tetrahydrate, 134 µL of 85% phosphoric acid aqueous solution, 138 mg of 1, 2, 4-triazole are measured and put into a mortar, and thereafter, mixed and stirred for 15 minutes at room temperature under atmosphere environment. The mixture is dried for 15 hours at 80° C. in a thermostatic chamber to obtain white powder.

The obtained white powder is analyzed by X-ray diffraction analysis. As a result, the obtained white powder has a crystal structure in which four molecules of 1,2,4-triazole coordinate to manganese ion having six coordination sites and two molecules of phosphate ion ($H_2PO_4$) coordinate to the manganese ion in the vertical direction.

Figure 5:
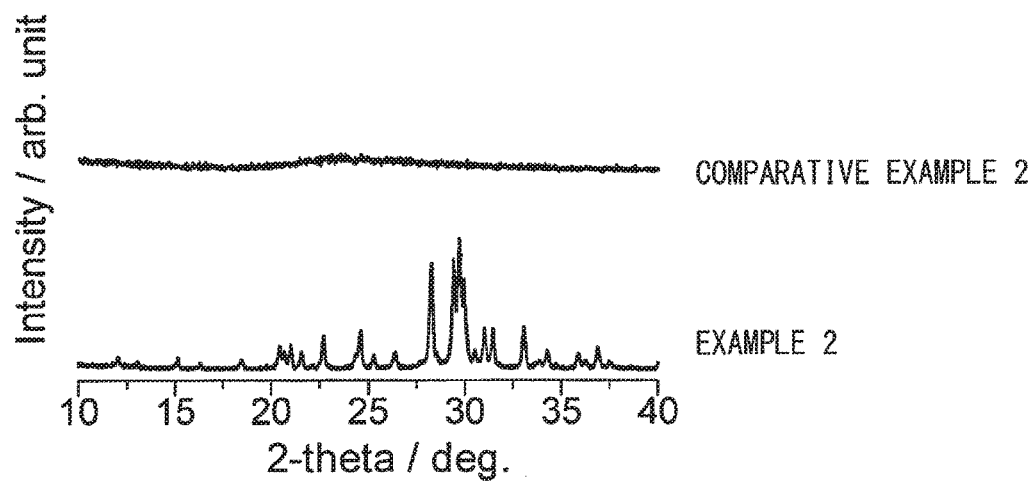
FIG. 5 is a diagram illustrating results of x-ray diffraction in example 2 and comparative example 2.

150 mg of the obtained crystalline white powder and 3560 mg of ball having 10 mm of diameter are enclosed in a container made of zirconia and having 20 mL of capacity, and air in the container is substituted by argon. Thereafter, ball milling is performed for 500 minutes at 400 rpm of rotation number to obtain non-crystalline powder. It is confirmed that the obtained powder is non-crystalline by the x-ray diffraction. The result of the x-ray diffraction is shown in FIG. 5. The obtained non-crystalline power is another one example of a proton conductor at least a part of which is non-crystalline.

As shown in FIG. 3, the obtained non-crystalline powder is molded into a pellet having 10 mm of diameter to obtain an electrolyte 1. As shown by arrows A1 and A2 of FIG. 3, electrodes 3, 5 made of gold and having 10 mm of diameter are attached at both sides of the electrolyte 1 to obtain a single cell 7 shown in FIG. 4. Ion conductivity of the single cell 7 is calculated by an AC impedance measurement. The measurement is executed under nitrogen atmosphere. Frequency domain is set from 0.1 Hz to 1 MHz and voltage magnitude is set to 300 mV. As a result, the ion conductivity of the single cell 7 is $1.2 \times 10^{-8}$ S/cm at 110° C.

Comparative Example 1

266 mg of cadmium acetate dihydrate, 134 µL of 85% phosphoric acid aqueous solution, 138 mg of 1, 2, 4-triazole are measured and put into a mortar, and thereafter, mixed and stirred for 15 minutes at room temperature under atmosphere environment. The mixture is dried for 15 hours at 80° C. in a thermostatic chamber to obtain white powder.

The obtained white powder is analyzed by X-ray diffraction analysis. As a result, the obtained white powder has a crystal structure in which four molecules of 1,2,4-triazole coordinate to cadmium ion having six coordination sites and two molecules of phosphate ion ($H_2PO_4$) coordinate to the cadmium ion in the vertical direction.

Similarly to the example 1, a single cell is formed using the obtained white powder. Ion conductivity of the single cell is calculated by an AC impedance measurement. As a result, the ion conductivity of the single cell is $6.3 \times 10^{-8}$ S/cm at 130° C.

Comparative Example 2

245 mg of manganese acetate tetrahydrate, 134 µL of 85% phosphoric acid aqueous solution, 138 mg of 1, 2, 4-triazole are measured and put into a mortar, and thereafter, mixed and stirred for 15 minutes at room temperature under atmosphere environment. The mixture is dried for 15 hours at 80° C. in a thermostatic chamber to obtain white powder.

The obtained white powder is analyzed by X-ray diffraction analysis. As a result, the obtained white powder has a crystal structure in which four molecules of 1,2,4-triazole coordinate to manganese ion having six coordination sites and two molecules of phosphate ion ($H_2PO_4$) coordinate to the manganese ion in the vertical direction.

Similarly to the example 1, a single cell is formed using the obtained white powder. Ion conductivity of the single cell is calculated by an AC impedance measurement. As a result, the ion conductivity of the single cell is $8.3 \times 10^{-10}$ S/cm at 110° C.

Although the embodiment of the present disclosure is described, the present disclosure is not limited to the embodiment and may be implemented in various other ways.

For example, a function of one of the elements of the embodiment may be dispersed in plural elements, or functions of the plural elements may be combined in the one of the elements. A part of elements of the embodiment may be omitted. At least one of the elements of the above embodiments may be added to the other embodiments, or at least one of the elements of the above embodiments may be replaced in the other embodiments.

The present disclosure may be implemented in various ways other than the proton conductor described above, such as the electrolyte material including the proton conductor and the method for producing the electrolyte material.

While only the selected exemplary embodiment and examples have been chosen to illustrate the present disclosure, it will be apparent to those skilled in the art from this disclosure that various changes and modifications may be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A proton conductor comprising:
   a coordination polymer having stoichiometrically:
      a plurality of metal ions;
      a plurality of oxoanions; and
      a plurality of proton coordinating molecules capable of undergoing protonation or deprotonation,
   the coordination polymer including a plurality of coordination entities that are repeatedly coordinated to bond the coordination entities with one another, wherein:
   each coordination entity of the plurality of coordination entities is either a first coordination entity or a second coordination entity;
   the first coordination entity is one metal ion of the plurality of metal ions coordinated with either (i) at least one oxoanion of the plurality of oxoanions or (ii) at least one proton coordinating molecule of the plurality of proton coordinating molecules;
   the second coordination entity is the metal ion coordinated with each of (i) at least one oxoanion of the plurality of oxoanions and (ii) at least one proton coordinating molecule of the plurality of proton coordinating molecules; and
   at least a part of the proton conductor is non-crystalline.

2. The proton conductor according to claim 1, wherein:
   the plurality of metal ions are one or more selected from a group consisting of cadmium ion, manganese ion and cobalt ion.

3. The proton conductor according to claim 1, wherein:
   the plurality of oxoanions are one or more selected from a group consisting of phosphate ion, hydrogen phosphate ion and dihydrogen phosphate ion.

4. The proton conductor according to claim 1, wherein:
   the plurality of proton coordinating molecules are one or more selected from a group consisting of imidazole, triazole, benzimidazole, benztriazole and derivatives thereof.

5. The proton conductor according to claim 1, wherein:
   the plurality of proton coordinating molecules are one or more selected from a group consisting of primary amine that is expressed by a general formula of $R-NH_2$, secondary amine that is expressed by a general formula of $R^1(R^2)-NH$, tertiary amine that is expressed by a general formula of $R^1(R^2)(R^3)-N$, diamine with linear carbon chain, saturated cyclic amine and saturated cyclic diamine, in which R, $R^1$, $R^2$ and $R^3$ independently represent one of alkyl group, aryl group, alicyclic hydrocarbon group and heterocyclic group.

6. The proton conductor according to claim 1, further comprising:
   an additive material that is one or more selected from a group consisting of metal oxide, organic polymer and alkali metal ion.

7. A method for producing the proton conductor according to claim 1 comprising:
   mixing a metal compound including the plurality of metal ions, the plurality of oxoanions and the plurality of proton coordinating molecules at a temperature equal to or lower than 200° C.; and
   applying a mechanical power to the metal compound, the plurality of oxoanions and the plurality of proton coordinating molecule.

8. The method for producing the proton conductor according to claim 7, wherein:
   the mechanical power is applied by one of a ball mill and a press machine.

9. A method for producing the proton conductor according to claim 6 comprising:
   mixing a metal compound including the plurality of metal ions, the plurality of oxoanions, the plurality of proton coordinating molecules and the additive material at a temperature equal to or lower than 200° C.; and
   applying a mechanical power to the metal compound, the plurality of oxoanions, the plurality of proton coordinating molecules and the additive material.

10. The method for producing the proton conductor according to claim 9, wherein:
the mechanical power is applied by one of a ball mill and a press machine.

11. A fuel cell comprising an electrolyte including the proton conductor according to claim 1.

\* \* \* \* \*